Feb. 3, 1959
J. R. FARNAND ET AL
2,872,419
ACTIVATED BLEACHING CLAY
Filed Sept. 20, 1954
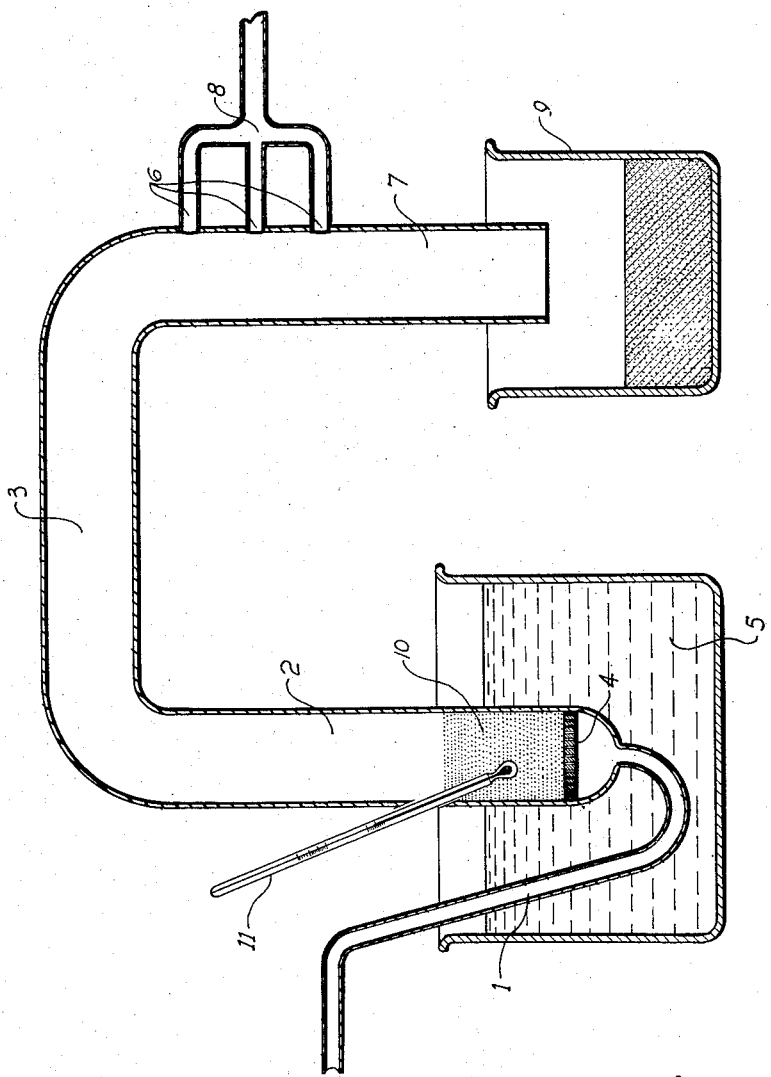

United States Patent Office 2,872,419
Patented Feb. 3, 1959

2,872,419

ACTIVATED BLEACHING CLAY

Joseph Redmond Farnand and Ira E. Puddington, Ottawa, Ontario, Canada, assignors to National Research Council, Ottawa, Ontario, Canada, a corporation of Canada Application September 20, 1954, Serial No. 457,276

4 Claims. (Cl. 252—450)

This invention relates to the activation of clay. Activated clay is used for a number of well known purposes, for example, in the decolourising of hydrocarbon and other oils.

A common method of activating clay up to now has been to suspend the clay in an aqueous solution of a strong acid, e. g. sulphuric acid, and heat under reflux for several hours. The amount of the acid itself is normally in the vicinity of 40–60% by weight of the clay and a sufficiently large quantity of water is added to make a suspension which can readily be boiled.

This prior method is by no means a neat one and is difficult to operate in a smooth manner. The method is uneconomical since a substantial quantity of heat is required to raise the temperature of what in practice would be a large quantity of water and to keep this water boiling. The long time necessary to complete the activation reaction and the large quantity of acid used also present uneconomical factors and, furthermore, corrosion problems are involved with the apparatus used.

It is the object of the present invention to provide a neater and more rapid method in which these disadvantages are eliminated or substantially reduced. It is a further object of the present invention to provide a method which not only is neater than prior art methods but also may be used to effect an improved activation of the clay as compared with that effected by prior art methods.

According to the present invention, an improved method for the continuous activation of a free-flowing mixture of clay and 5–40% by weight of concentrated sulphuric acid, comprises: (A) passing heated air through said free flowing mixture to heat said mixture to a temperature above about 95° C.; (B) contacting said heated, fluidized mixture with added saturated steam to activate said mixture substantially instantaneously; and (C) recovering the activated clay so formed.

The quantity of sulphuric acid used must, of course, be sufficiently great to effect the desired activation. On the other hand, in order to obtain the intimate contact between the steam and the mixture, the acid is used in sufficiently small proportion that the mixture is still free-flowing, or in other words that the particles of the clay are not clogged together. It has been found that 5–40% of the acid by weight of the clay satisfies these conditions with the present invention. About 20% of the acid by weight of the clay appears to be the most useful proportion.

The activating reaction between the sulphuric acid and ingredients of the clay cannot take place until water is present. The present invention takes advantage of this fact to obtain a preliminary mixture of the clay and the sulphuric acid before the reaction begins. This mixture is as homogeneous as possible in order to obtain a thorough distribution of the acid in the clay so that the subsequent reaction takes place uniformly throughout the mass.

The mixture of clay and acid is heated to a temperature not substantially below 100° C. before contacting the mixture with the steam. This pre-heat treatment is to a specific minimum of 95° C. but may be substantially above 100° C. to a point limited by practical considerations. This pre-heat treatment is mainly for the purpose of avoiding excessive condensation during the subsequent steam treatment. The activating reaction cannot take place to any substantial degree until the temperature has risen close to 100° C. or above and until some water has condensed from the steam. If the mixture is treated with steam without previous heating to substantially the proper reaction temperature, there will be a delay before the full reaction commences while the mixture is being heated by the steam to the proper reaction temperature. During this delay, there will be excessive condensation over and above that amount required to cause the reaction, and the extra water will serve to dilute the sulphuric acid and hence reduce the efficiency of the reaction. It has been found that the greater the concentration of acid taking part in the activating reaction the greater the bleaching efficiency of the resultant activated clay provided that sufficient water is present to effect the reaction. The preferred proportion of water is 40–100% by weight of the clay.

For the above reasons, the full advantages of the present invention will not be achieved if the pre-heat treatment is effected by means involving appreciable condensation of water, e. g. by a pre-heating steam treatment.

In theory, the activation reaction could be effected by treating the heated mixture with hot water close to the boiling point. In practice, however, it is impossible to obtain uniform distribution of the water and hence uniform reaction throughout the mass treated. The use of steam is therefore necessary to achieve the improved neat method which is the main object of the present invention.

In the invention, the preliminary heating and the steam treatment are performed respectively by first passing heated air through the mixture of clay and sulphuric acid, to cause fluidising of the mixture, until the desired temperature is reached and then blowing the mixture through a zone into which steam is injected. It is found that this method can be continuous and that the momentary contact with steam gives an activation reaction substantially instantaneously.

The method described is illustrated in the single figure of the accompanying drawing which shows a diagrammatic laboratory apparatus.

In this drawing, a tube 1 leads from an air pressure source (not shown) to the bottom of the left-hand arm 2 of an inverted U-tube 3. At the bottom of the arm 2 is the normal type of perforated disc 4 utilised for the purpose of supporting a mass of particles to be fluidised. The lower portion of the arm 2 dips into a vessel 5 containing oil. A number of steam injection ports 6 are provided in the vertical wall of the arm 7 of the U-tube 3 and steam is supplied to these ports 6 from a source (not shown) via a pipe system 8. A receptacle 9 is located immediately below the open end of arm 7.

A mass of the clay-acid mixture used in the present invention is contained in the arm 2 and designated as 10. A thermometer 11 is very diagrammatically shown as inserted through the wall of the arm 2 and inserted into the mass 10.

In the operation of this apparatus, air is passed through the tube 1 and disc 4 to enter the arm 2 at sufficient pressure to fluidise the mass 10. The air is pre-heated as required either by special heating means (not shown) and/or by the oil in the vessel 5. This oil is maintained at substantially the temperature required for the mass 10. The combination of the heated air and the heated oil, together with the excellent heat transfer resulting from the fluidisation of the mass, brings the mass rapidly to the required temperature which will be indicated by the thermometer 11. The air velocity in the arm 2 is then increased until the mass 10 of clay particles with absorbed sulphuric acid is blown up through the U-tube to the arm 3 where it is contacted by a large excess of steam injected through the ports 6. The particles of clay then undergo very rapid reaction with the sulphuric acid and fall into the receptacle 9. The clay is then washed to remove the acid and dried, and is then ready for use.

The fluidising of the mass 10 has the further advantages of making a more uniform mixture of the clay and the acid and also causes a separation of the particles so that intimate contact with the steam is ensured to give a fast reaction.

The following Examples 1–5 describe the treatment of various samples of clays under different conditions utilising the method and apparatus described above, in each case the clay containing 20% by weight of the sulphuric acid. The activated clays resulting therefrom were then used to decolourise in the normal manner samples of unbleached mineral oil having a viscosity of about 500 S. S. U. at 100° F. The effectiveness of the discolourising is indicated in the table following the examples by indicating the percentage of transmission of green and red light assuming the medicinal oil sold under the name Stanolax to have a transmission of 100% in each case.

Example 6 illustrates a treatment of the same clay by a prior art method and the resultant activated clay is tested in the same manner as described above.

EXAMPLE 1

Clay and concentrated sulfuric acid were placed in arm 2 of the apparatus. Preheated air was blown through the sample at a sufficient pressure to fluidize the mass and thereby mixing it thoroughly. The sample was equilibrated at 120° C., air pressure was increased thereby blowing the clay-acid mixture into an atmosphere of steam, in arm 7 of the U-tube. The wet clay dropped into a receptacle 9 below and was washed immediately in the conventional manner.

The sample was dried and evaluated by adding a portion to unbleached mineral oil and determining the percentage light transmission for red and green light. The results are given in the table below.

EXAMPLES 2–5

The method of Example 1 was repeated, except different temperatures were used. In Example 2 the clay was equilibrated at temperature of 130° C. before transportation to the steam treating zone.

In Example 3 the clay was equilibrated at a temperature of 100° C. before transportation to the steam treating zone.

In Example 4 the clay was equilibrated at 60° C. prior to contact with steam.

In Example 5 the clay was equilibrated at 30° C. prior to steam treatment.

The percentage light transmission of red and green light for these examples is also given in the table below.

EXAMPLE 6

The clay was activated by refluxing for 2 hours with 20% of acid based on the weight of the clay at a concentration of about 4%.

Table.—Percentage light transmission

| Example | Light Transmission | |
|---|---|---|
| | Red | Green |
| Stanolax | 100 | 100 |
| 1 | 94 | 81 |
| 2 | 94 | 81 |
| 3 | 93 | 80 |
| 4 | 90 | 71 |
| 5 | 89 | 71 |
| 6 | 88 | 73 |

These results show that clay activated according to the process of the present invention are much more effective in decolorising oil than clay activated according to the prior art process. In addition, even when the temperature of equilibration of the clay is below the preferred minimum, the clay is also activated to a greater extent than clay activated according to the prior art.

The sulfuric acid used in the above examples is commercial 96% concentrated sulfuric acid. The very small quantity of water contained therein can in practice be tolerated.

We claim.

1. In the method for the continuous activation of a free-flowing mixture of clay and 5–40% by weight of concentrated sulphuric acid, the improvement which comprises the steps in sequence of: (A), passing heated air through said free flowing mixture to heat said mixture to a temperature above about 95° C.; (B), contacting said heated, fluidized mixture with added saturated steam to activate said mixture substantially instantaneously; and (C), recovering the activated clay so formed.

2. In the method for the continuous activation of a free-flowing mixture of clay and 5–40% by weight of concentrated sulphuric acid, the improvement which comprises the steps in sequence of: (A), passing heated air through said free flowing mixture to heat said mixture to a temperature of 100–130° C.; (B), contacting said heated, fluidized mixture with added saturated steam to activate said mixture substantially instantaneously; and (C), recovering the activated clay so formed.

3. In the method for the continuous activation of a free-flowing mixture of clay and 5–40% by weight of concentrated sulphuric acid, the improvement which comprises the steps in sequence of: (A), passing heated air through a heating zone containing said free flowing mixture to heat said mixture to a temperature above about 95° C.; (B), passing said heated, fluidized mixture through a separate treating zone and simultaneously introducing saturated steam therethrough to activate said mixture substantially instantaneously; and (C), recovering the activated clay so formed.

4. In the method for the continuous activation of a free-flowing mixture of clay and 5–40% by weight of concentrated sulphuric acid, the improvement which comprises the steps in sequence of: (A), passing heated air through said free flowing mixture to heat said mixture to a temperature of 100–130° C.; (B), passing heated, fluidized mixture through a separate treating zone and simultaneously introducing saturated steam therethrough to activate said mixture substantially instantaneously; and (C), recovering the activated clay so formed.

References Cited in the file of this patent

UNITED STATES PATENTS

| | | |
|---|---|---|
| 1,739,734 | Raine et al. | Dec. 17, 1929 |
| 1,792,625 | Baylis | Feb. 17, 1931 |
| 2,066,212 | McKellar | Dec. 29, 1936 |
| 2,192,000 | Wilson | Feb. 27, 1940 |
| 2,477,664 | Shabaker | Aug. 2, 1949 |